US007175757B2

(12) United States Patent
Hamada et al.

(10) Patent No.: US 7,175,757 B2
(45) Date of Patent: Feb. 13, 2007

(54) TREATMENT LIQUID SUPPLY SYSTEM

(75) Inventors: Yuki Hamada, Tokyo (JP); Kay Fujimori, Tokyo (JP)

(73) Assignee: Fujimori Technical Laboratory Inc., Tokyo (JP)

( * ) Notice: Subject to any disclaimer, the term of this patent is extended or adjusted under 35 U.S.C. 154(b) by 548 days.

(21) Appl. No.: 10/671,219

(22) Filed: Sep. 25, 2003

(65) Prior Publication Data

US 2005/0067334 A1 Mar. 31, 2005

(51) Int. Cl.
*B01D 33/82* (2006.01)
*B01D 17/12* (2006.01)
*B05B 7/26* (2006.01)
*B05B 7/28* (2006.01)
*B05B 7/30* (2006.01)

(52) U.S. Cl. ..................... 210/97; 210/406; 210/257.1; 239/303; 239/308; 239/310; 239/311; 239/318; 239/335; 239/337; 239/346

(58) Field of Classification Search ..................... None
See application file for complete search history.

(56) References Cited

U.S. PATENT DOCUMENTS 817,219 A * 4/1906 Walkup ................... 122/18.31
1,488,125 A * 3/1924 Kline ......................... 222/394
3,595,481 A * 7/1971 Enblom ...................... 239/129
3,618,862 A 11/1971 Bell et al.
4,526,191 A 7/1985 Pomponi, Jr.

FOREIGN PATENT DOCUMENTS

DE 287456 C 4/1914
JP 60 206460 A 10/1985

* cited by examiner

*Primary Examiner*—Krishnan S. Menon
(74) *Attorney, Agent, or Firm*—Lawrence E. Laubscher, Jr.

(57) ABSTRACT

In a treatment liquid supply system that supplies treatment liquid used for coating industrial objects for film formation including a semiconductor substrate, a display substrate, a glass and the like, a nozzle connected to a treatment liquid tank vacuum-sucks and injects the treatment liquid from the treatment liquid tank due to a negative pressure occurring in the nozzle, wherein supply control of a small flow amount of the treatment liquid to the nozzle can be performed due to a difference pressure between pressure in the treatment liquid tank and the negative pressure occurring in the nozzle.

5 Claims, 6 Drawing Sheets

TREATMENT LIQUID SUPPLY SYSTEM

BACKGROUND OF THE INVENTION

1. Field of the Invention

The present invention relates to a treatment liquid supply system that supplies treatment liquid used for coating industrial objects for film formation including a semiconductor substrate, a display substrate, a glass and the like, and in particular, to a treatment liquid supply system that performs supply control of a small flow amount of the treatment liquid by using a nozzle that vacuum-sucks and injects the treatment liquid from a treatment liquid tank.

2. Description of the Related Art

There is an earlier treatment liquid supply system where, when a film is coated on a semiconductor substrate and a display substrate in a manufacturing process of a semiconductor apparatus, a liquid crystal display apparatus and so on, as shown in FIG. 7, a wafer 1 rotates at a high speed with the wafer 1 being supported horizontally and treatment liquid 3 is dripped at a location near a central bore 2 of the wafer 1 from above the wafer 1.

Centrifugal force effecting on the treatment liquid 3 dripped on the wafer 1 that rotates at a high speed makes the treatment liquid to radially spread out on the surface of the wafer 1 to form a film as coated on the entire surface of the wafer 1.

As another example, in case where treatment liquid is coated on a semiconductor substrate and a display substrate by spray coating, as shown in FIG. 8, a treatment liquid supply system that comprises a treatment liquid tank 6 storing treatment liquid 5 therein, a treatment liquid supply pipe 7 connected to the treatment liquid tank 6, and a nozzle 8 connected to the treatment liquid supply pipe 7 wherein the nozzle 8 discharges the treatment liquid 5 supplied from the treatment liquid tank 6. A flow amount adjustment valve 9 such as a needle valve is disposed in the middle of the treatment liquid supply pipe 7 to control supply amount of the treatment liquid to the nozzle 8 whereby the treatment liquid 5 is discharged for coating from the nozzle 8 by controlling a flow amount of the treatment liquid supply through the flow amount adjustment valve 9 with the treatment liquid 5 inside the treatment liquid tank 6 being pressurized or with the treatment liquid 5 being supplied by a pump (not shown).

In the earlier apparatus as shown in FIG. 7, however, when an amount of the treatment liquid 3 dripped on the wafer 1 becomes so small, the treatment liquid 3 does not disperse well. Therefore, the treatment liquid 3 of more than 10 ml/min is necessary to drip for film formation on the entire surface of the wafer1. As a result, the treatment liquid 3 disperses toward the outer direction by centrifugal force of the high-speed-rotating wafer1 and part of the treatment liquid 3 is coated on the surface of the wafer 1 and the rest thereof drops outside of the wafer 1.

As described above, an efficiency of the treatment liquid coating deteriorates and the treatment liquid supply apparatus is not economical due to a large amount of the treatment liquid 3 being dripped, as well as being wasted discarded outside of the wafer 1. Moreover, An environment around the apparatus is possibly polluted by the treatment liquid 3 wasted outside of the wafer1.

In the earlier apparatus as shown in FIG. 8, flow control of the treatment liquid 5 supplied to the nozzle 8 is performed by the flow amount adjustment valve 9 such as a needle valve disposed in the middle of the treatment liquid supply pipe 7 and as a result, such flow amount adjustment valve 9 does not enable flow control of the treatment liquid 5 at an amount of 1 ml/min or less than it. Therefore, it is difficult to evenly coat a film on an object by supplying the treatment liquid 5 of less than 1 ml/min. Further, if foreign matter such as dusts and carbons is mixed with the treatment liquid 5 inside the treatment liquid tank 6, it causes plugging in the flow amount adjustment valve 9 disposed in the treatment liquid supply pipe 7 to the nozzle 8, thereby to block supplying of the treatment liquid 5 to the nozzle 8 and therefore, processing of a treatment liquid coating does not proceed smoothly.

SUMMARY OF THE INVENTION

The present invention, in view of the foregoing problems, has an object of providing a treatment liquid supply system that performs supply control of a small flow amount of treatment liquid by using a nozzle that vacuum-sucks and injects the treatment liquid from a treatment liquid tank.

In order to achieve the above object, a treatment liquid supply system according to the invention, comprises a treatment liquid tank storing treatment liquid therein with the treatment liquid tank being air-tightly closed, a nozzle connected to the treatment liquid tank through a treatment liquid supply pipe wherein the nozzle vacuum-sucks and injects the treatment liquid in the treatment liquid tank due to vacuum occurring in the nozzle caused by supplying pressurized air from outside of the nozzle thereto, an air suction device branched in the vicinity of the nozzle from the treatment liquid tank and connected to an upper side of the treatment liquid tank wherein the air suction device generates vacuum in the treatment liquid tank by sucking in air in an inner space thereof, and a positive pressure supply device that supplies a positive pressure gas at a desired pressure to a vacuum space formed in the inner space inside the treatment liquid tank, wherein flow supply of the treatment liquid to the nozzle is controlled by adjusting pressure of the positive pressure gas supplied to the treatment liquid tank by the positive pressure supply device.

According to the above construction, the flow supply of the treatment liquid to the nozzle is controlled in a way that the treatment liquid is stored in the air-tightly closed treatment liquid tank, the nozzle is connected to the treatment liquid tank through a treatment liquid supply pipe wherein the nozzle vacuum-sucks and injects the treatment liquid in the treatment liquid tank due to vacuum occurring in the nozzle caused by supplying pressurized air from outside of the nozzle thereto, the air suction device is branched in the vicinity of the nozzle from the treatment liquid tank and connected to an upper side of the treatment liquid tank wherein the air suction device generates vacuum therein by sucking in air in an inner space thereof, and the positive pressure supply device supplies a positive pressure gas at a desired pressure to a vacuum space formed in the inner space inside the treatment liquid tank, wherein flow supply of the treatment liquid to the nozzle is controlled by adjusting pressure of the positive pressure gas supplied to the treatment liquid tank by the positive pressure supply device.

A pressure control device that adjusts pressure of a positive pressure gas supplied to the treatment liquid tank is provided between the positive pressure supply device and the treatment liquid tank, thereby to easily adjust the pressure of the positive pressure gas supplied to treatment liquid tank.

Moreover, the pressure control device may be a mass flow controller that adjusts a flow amount of the positive pressure gas by measuring flow mass thereof, thereby to definitely adjust the flow amount of the positive pressure gas supplied to the treatment liquid tank in proportion to the flow mass thereof without influence of pressure or temperature change of the positive pressure gas and easily adjust the pressure of the positive pressure gas supplied to the treatment liquid tank.

Further, the positive pressure supply device supplies an atmospheric gas or an inert gas. Particularly when the inert gas is supplied, the pressure is stably kept without affecting the treatment liquid in the treatment liquid tank.

Moreover, the nozzle in which a negative pressure occurs due to supplying the highly-pressurized air may be used as a vacuum suction device to pipes connected to the nozzle. Accordingly a vacuum pump other than the nozzle as the vacuum suction device is not needed for each pipe.

Further, there is provided with a wash liquid tank connected to the treatment liquid tank or the nozzle wherein wash liquid is sucked into the treatment liquid tank or the nozzle from the wash liquid tank due to using a vacuum occurring in the nozzle to wash them. As a result, the washing can be carried out without a separate wash liquid suction pump, enabling simplification as well as cost reduction of the system.

Also the treatment liquid tank, the nozzle, the pipes connecting them, and opening and closing valves may be integrally formed as a single member. Accordingly the treatment liquid tank and the nozzle can be formed in a small size, thereby enabling miniaturization of an entire system structure and a simple system structure.

BRIEF DESCRIPTION OF THE DRWAINGS

DETAILED DESCRIPTION OF THE PREFERRED EMBODIMENTS

Figure 1:
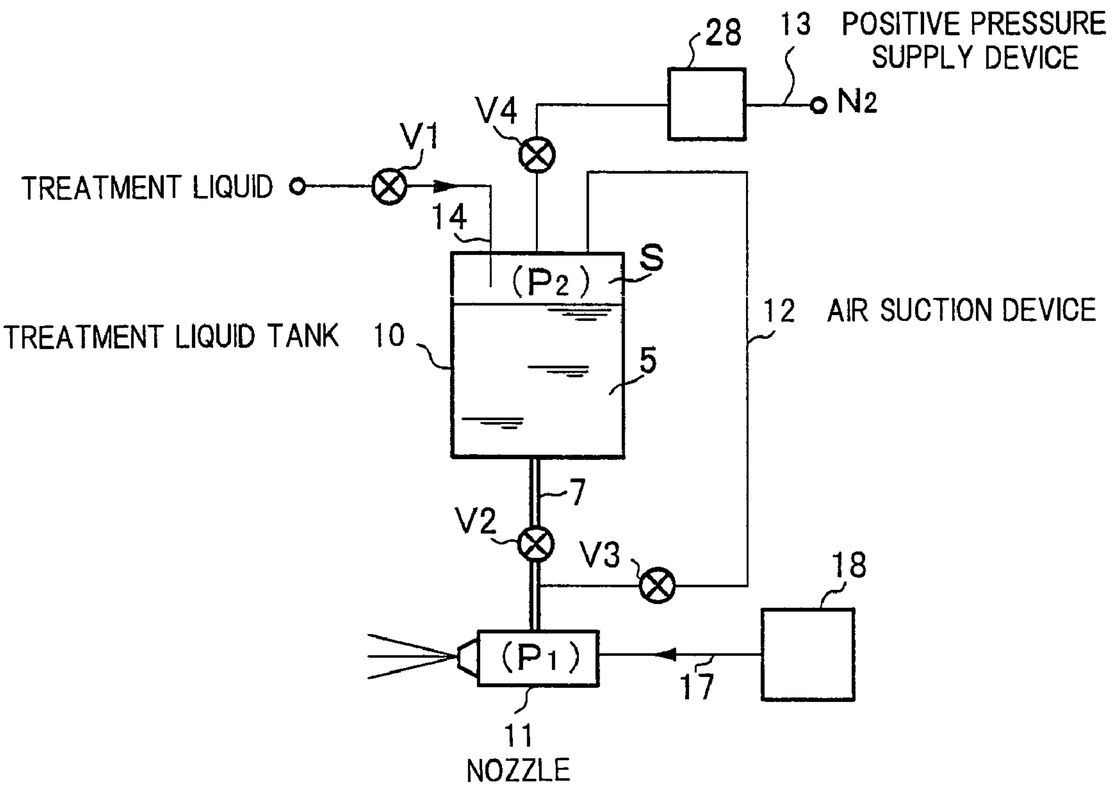
FIG. 1 is a system schematic view showing an embodiment of a treatment liquid supply system according to the invention.

FIG. 1 is a system schematic view showing an embodiment of a treatment liquid supply system according to the invention. The treatment liquid supply system supplies treatment liquid for various treatments that is coated on industrial objects for film formation including a semiconductor substrate, a display substrate, a glass and the like, and comprises a treatment liquid tank 10, a nozzle 11, an air suction device 12, and a positive pressure supply device 13.

The treatment liquid tank 10 stores various types of treatment liquid 5 coated on the industrial objects for film formation and the treatment liquid tank 10 is formed as a vessel of a certain size and air-tightly closed by covering an upper side thereof by a lid, thereby to be able to form a vacuum space inside the treatment liquid tank 10. A pipe line 14 is connected to the upper side of the treatment liquid tank 10 to supply the treatment liquid 5 thereto. A valve V1 is disposed in the middle of the pipe line 14 to open and close the pipe line 14.

A treatment liquid supply pipe 7 is connected to a bottom of the treatment liquid tank 10 and a nozzle 11 is connected to a tip of the treatment liquid supply pipe 7. A valve V2 is disposed in the treatment liquid supply pipe 7 to open and close a supply passage to the nozzle 11. The nozzle 11 vacuum-sucks the treatment liquid 5 supplied through the treatment liquid supply pipe 7 from the treatment liquid tank 10 caused by supplying pressurized air from outside thereof and injects it. The tip of the treatment liquid supply pipe 7 is connected to a side portion of the nozzle 11 and a highly-pressurized-air supply pipe 17 is connected to an axial portion of the nozzle 11. A compressor 18 is disposed in an end of the highly-pressurized-air supply pipe 17.

Figure 2:
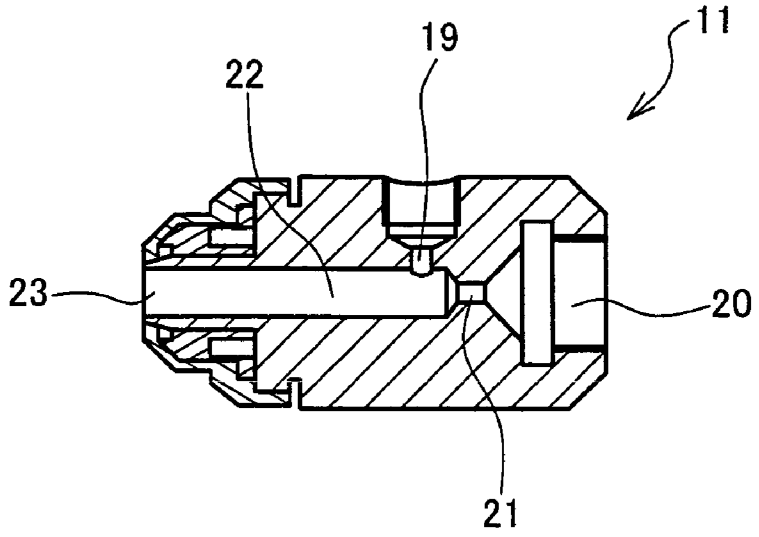
FIG. 2 is a cross section view showing an embodiment of a nozzle used in the embodiment of the treatment liquid supply system.
Figure 3:
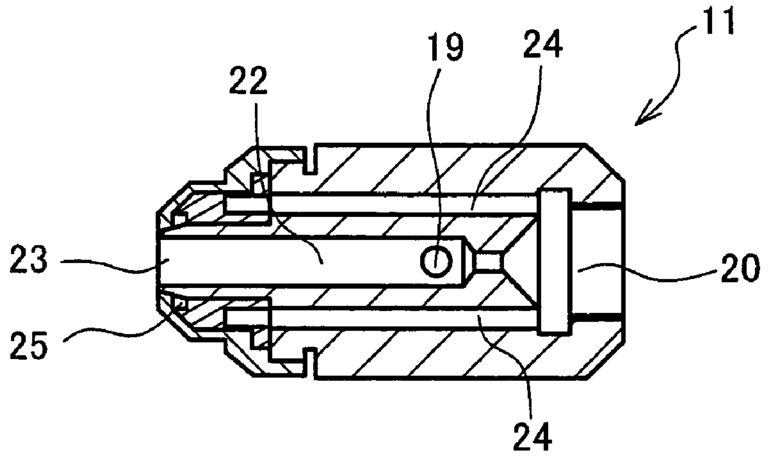
FIG. 3 is a cross section view showing the embodiment of the nozzle in a cross section perpendicular to the cross section view in FIG. 2.

Each of FIG. 2 and FIG. 3 is a cross section showing an embodiment of a detailed structure of the nozzle 11. FIG. 2 is a vertical cross section including a portion to which the treatment liquid supply pipe 7 is connected and FIG. 3 is a vertical cross section perpendicular to the cross section in FIG. 2.

In FIG. 2, a treatment liquid inlet 19 is formed at a side portion of the nozzle 11 and the tip of the treatment liquid supply pipe 7 is connected to the inlet 19. A highly-pressurized-air inlet 20 is formed at a rear end of the axial portion of the nozzle 11 and the tip of the highly-pressurized-air supply pipe 17 is connected to the inlet 20.

In this state, when a highly-pressurized air supplied through the highly-pressurized-air supply pipe 17 by operating the compressor 18 shown in FIG. 1 flows into the axial portion of the nozzle 11 from the highly-pressurized-air inlet 20 shown in FIG. 2 and enters into an inner mixture chamber 22 via a primary-air spout outlet 21 of a smaller diameter, a vacuum occurs at a location of the inlet 19 to which the treatment liquid supply pipe 7 shown in FIG. 1 is connected, due to an effect of a venturi tube, thereby to sucking in the treatment liquid 5 from the treatment liquid supply pipe 7 to the inner mixture chamber 22. The high-speed air spouted from the primary-air spout outlet 21 strikes the treatment liquid 5 sucked from the inlet 19 to pieces, as well as is mixed with the treatment liquid 5 in the wider-inner mixture chamber 22, thereby to slow down, and is injected from a spout outlet 23 at a nozzle tip.

On the other hand, as shown in FIG. 3, the highly-pressurized air flown into the nozzle 11 from the highly-pressurized-air inlet 20 goes to a secondary-air spout groove 25 formed in a spiral shape at the tip of the nozzle 11 through a secondary-air passage 24 formed at an outer side in a radial direction from the axial portion in the nozzle 11 and is injected in a high-speed swirl from the secondary-air spout groove 25. Then, the highly-pressurized air forms atomization of the treatment liquid 5 by a secondary mixing with the treatment liquid 5 in the inner mixture chamber 22 and injects forward the atomized treatment liquid 5 from the spout outlet 23. In FIG. 2 and FIG. 3, the nozzle 11 injects in a swirl, but not limited thereto, may be a normal nozzle that does not form a swirl.

The air suction device 12 connects the treatment liquid supply pipe 7 to the upper side of the treatment liquid tank 10 as shown in FIG. 1. The air suction device 12 is branched in the vicinity of the nozzle 11 from the treatment liquid supply pipe 7 and connected to the upper side of the treatment liquid tank 10 to build vacuum therein by sucking in air of an inner space S in the treatment liquid tank 10, and includes a feedback line that associates a negative pressure occurring in the nozzle 11 with the treatment liquid tank 10.

A base end of the feedback line as the air suction device 12 is connected to the treatment liquid supply pipe 7 between the valve V2 and the nozzle 11. A valve V3 is disposed in the vicinity of the base end of the feedback line to open and close the feedback line to the treatment liquid tank 10.

The positive pressure supply device 13 is connected to the upper side of the treatment liquid tank 10 and supplies a positive pressure gas at a desired pressure to the vacuum space formed in the inner space S inside the treatment liquid tank 10 and includes a pipe line connected to a nitrogen gas bomb at a base end thereof that supplies an inert gas of 1–2 atm, for example, nitrogen gas ($N_2$). A pressure controller 28 is disposed between the positive pressure supply device 13 and the treatment liquid tank 10 to control pressure of a positive pressure gas supplied to the treatment liquid tank 10, namely to control pressure of the nitrogen gas supplied from the nitrogen gas bomb.

A valve V4 is disposed in the middle of the pipe line as the positive pressure supply device 13 to open and close the pipe line to the treatment liquid tank 10.

The positive pressure supply device 13 supplies a positive pressure gas to the treatment liquid tank 10 via the controller 28 that adjusts the pressure of the positive pressure gas, thereby to easily control the pressure of the positive pressure gas to the treatment liquid tank 10. Accordingly, supply of the treatment liquid to the nozzle 11 can be controlled by a preciously slight amount by adjusting the pressure inside the treatment liquid tank 10.

An operation of the treatment liquid supply system as described above will be explained next. In FIG. 1, a predetermined amount of the treatment liquid 5 is supplied to the treatment liquid tank 10 by closing the valve V2 in the treatment liquid supply pipe 7 connected to the bottom of the treatment liquid tank 10, as well as opening the valve V1 in the pipe line 14. Thereafter, the treatment liquid tank 10 becomes air-tightly closed by closing the valve V1, as well as closing the valve V4 in the positive pressure supply device 13.

On this occasion, the valve V3 in the feedback line 12 branched from the treatment liquid supply pipe 7 becomes opened to supply a highly pressurized air to the nozzle 11 via the highly-pressurized-air supply pipe 17 from the compressor 18. Then, as explained with reference to FIG. 2, a negative pressure (for example, 0.1–0.4 atm) occurs at the treatment liquid inlet 19 of the nozzle 11 and the negative pressure is conveyed to the inner space S in the treatment liquid tank 10 through the feedback line 12 to suck in the air in the inner space S. As a result of the air suction, pressure in the inner space S of the treatment liquid tank 10 becomes a negative pressure $P_2$ (for example, 0.1–0.4 atm). In this state the valve V3 in the feedback line 12 is closed.

Next, the valve V2 becomes opened, as well as a highly-pressurized air is supplied to the nozzle 11 via the highly-pressurized-air supply pipe 17 from the compressor 18 shown in FIG. 1. Then, as described above, the negative pressure (for example, from 0.1 to 0.4 atm) occurs at a location of the treatment liquid inlet 19 in the nozzle 11, which causes suction of the treatment liquid 5 from the treatment liquid supply pipe 7. On this occasion, since the pressure in the inner space S of the treatment liquid tank 10 is negative, the negative pressure $P_1$ occurring in the nozzle 11 and the negative pressure $P_2$ in the inner space S of the treatment liquid tank 10 are regulated to be equal. A pressure gage to measure pressure $P_1$ may be mounted in the treatment liquid supply pipe 7 downstream of the valve V2 and a pressure gage to measure pressure $P_2$ in the inner space S of the treatment liquid tank 10 may be mounted.

When $P_1=P_2$, the treatment liquid 5 dose not flow and the treatment liquid 5 becomes stable to stay therein. This state is determined to be an initial state of the treatment liquid supply and a process of the treatment liquid supply starts from this state. Then, since flow of the treatment liquid 5 stops in the vicinity of the treatment liquid inlet 19 in the nozzle 11 shown in FIG. 2, a path to the nozzle 11 does not dry up. Accordingly, the treatment liquid 5 can be injected from the nozzle 11 quickly thereafter.

Next, an spout outlet 23 of the nozzle 11 is set to be directed to an object coated by the treatment liquid 5 and the compressor 18 supplies the highly-pressurized air to the nozzle 11 through the highly-pressurized-air supply pipe 17 in the same as the above. However, since $P_1=P_2$ on this occasion, the treatment liquid 5 is not injected from the nozzle 11. Therefore, a pressure of the positive pressure gas supplied to the treatment liquid tank 10 is regulated by opening the valve V4 and properly adjusting the pressure controller 28 disposed in the positive pressure supply device 13 shown in FIG. 1. As a result, the pressure $P_2$ increases with change of the pressure in the treatment liquid tank 10, causing a pressure difference between $P_1$ and $P_2$. The treatment liquid 5 is supplied to the nozzle 11 from the treatment liquid tank 10 due to the pressure difference. Accordingly, the treatment liquid 5 is injected from the nozzle 11.

The pressure difference between $P_1$ and $P_2$ is minutely adjusted as a result of a minute pressure adjustment of the pressure controller 28, thereby to minutely control supply flow of the treatment liquid 5 to the nozzle 11. For example, supply amount of the treatment liquid 5 can be controlled in the range of approximately 1 ml/min or less than it (for example, approximately from 0.1–0.9 ml/min) which is impossible in an earlier apparatus. Accordingly, the supply of the treatment liquid 5 can be minutely controlled due to the difference between the pressure in the treatment liquid tank 10 and the negative pressure occurring in the nozzle 11, thereby to evenly coat the treatment liquid 5 on the object.

Moreover, an efficiency, as well as economy of treatment liquid coating improves by reducing an amount of the treatment liquid 5 used. Further, the entire system structure can be simplified as a result of creating a negative pressure in the inner space of the treatment liquid tank 10 without a vacuum pump.

Also even if the viscosity of the treatment liquid 5 is high, the treatment liquid 5 can be supplied to the nozzle 11 due to a difference (pressure difference between $P_1$ and $P_2$) between the negative pressure in the nozzle 11 and the pressure in the treatment liquid tank 10. Since a flow amount adjustment valve such as an earlier needle valve is not disposed in the treatment liquid supply pipe 7 to the nozzle 11, the treatment liquid 5 can be smoothly supplied to the nozzle 11 with no foreign matter being stuck therein.

As shown in FIG. 1, the pressure controller 28 is disposed as a pressure control device for the positive pressure supply device 13, but the invention is not limited thereto, and a mass flow controller to measure and control a mass of the flow amount of the positive pressure gas may be used. In this case the flow amount of the positive pressure gas supplied to the treatment liquid tank 10 is stably adjusted in proportion to a mass of the flow amount thereof without influence of change in pressure and temperature of the positive pressure gas, and the pressure of the positive pressure gas supplied to the treatment liquid tank 10 is easily adjusted. Accordingly, the pressure in the treatment liquid tank 10 is easily and stably adjusted and the supply of the treatment liquid 5 to the nozzle 11 can be minutely controlled. Also an air may be supplied instead of supplying nitrogen gas to the positive pressure supply device 13.

Figure 4:
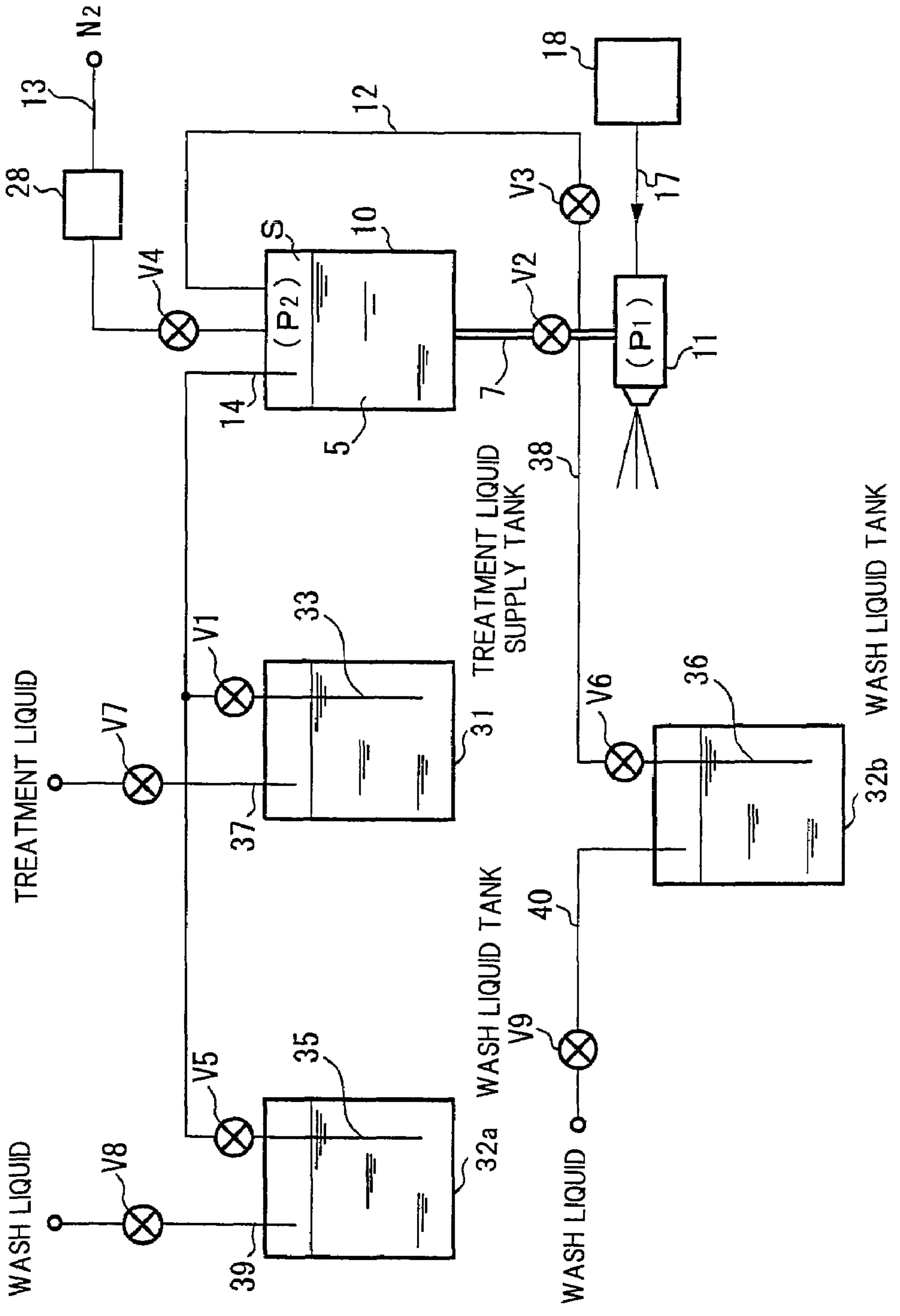
FIG. 4 is an entire view of a system to which the treatment liquid supply system of the embodiment shown in FIG. 1 is applied.

FIG. 4 is a detailed embodiment of a treatment liquid supply system using the embodiment shown in FIG. 1. In the embodiment a treatment supply tank 31 and a first wash liquid tank 32*a* are connected to the treatment liquid tank 10 to supply treatment liquid and wash liquid to the treatment liquid tank 10. A second wash liquid tank 32*b* is connected to the treatment liquid supply pipe 7 to supply the wash liquid to the nozzle 11. A treatment liquid suction pipe 33 is inserted into the treatment liquid supply tank 31 and connected to the pipe line 14 to supply the treatment liquid 5 to the treatment liquid tank 10 through a valve V1 for opening and closing connection between the pipe line 14 and the suction pipe 33. A wash liquid suction pipe 35 is inserted into the first wash liquid tank 32*a* and connected to the pipe line 14 through a valve V5 for opening and closing connection therebetween. A wash liquid sunction pipe 36 is inserted into the second wash liquid tank 32*b* and connected to another pipe line 38 via a valve V6 to supply the wash liquid to the nozzle 11.

A treatment liquid supplementary pipe 37 is connected to an upper side of the treatment liquid supply tank 31 and a valve V7 is disposed prior to a treatment liquid supplementary inlet of the treatment liquid supplementary pipe 37 for opening and closing it. A wash liquid supplementary pipe 39 is connected to an upper side of the first wash liquid tank 32*a* and a valve V8 is disposed prior to a wash liquid supplementary inlet of the wash liquid supplementary pipe 39 for opening and closing it. Another wash liquid supplementary pipe 40 is connected to an upper side of the second wash liquid tank 32*b* and a valve V9 is disposed prior to a wash liquid supplementary inlet of the wash liquid supplementary pipe 40.

In order to supply the treatment liquid 5 to the treatment liquid tank 10 according to the above construction, firstly the valve V5 in the wash liquid suction pipe 35 is closed and also the valve V1 in the treatment liquid suction pipe 33 is opened and the valve V4 is closed in the positive pressure supply device 13 and the valve V2 in the treatment liquid supply pipe 7 of the treatment liquid tank 10 is closed.

Secondly, the valve V3 for the feedback line 12 is opened and a highly pressurized air is supplied via the highly-pressurized-air supply pipe 17 to the nozzle 11 from the compressor 18. Then, a negative pressure occurring in the nozzle 11 becomes associated with the inner space S of the treatment liquid tank 10 through the feedback line 12 so that a negative pressure occurs caused by sucking in the air in the inner space S of the treatment liquid tank 10 due to the associated negative pressure.

Accordingly, the treatment liquid 5 is sucked from the treatment liquid supply tank 31 due to the negative pressure in the inner space S and the treatment liquid 5 is supplied to the treatment liquid tank 10 through the pipe line 14. Thereafter, the valve V1 is closed to end supply of the treatment liquid 5 wherein the pressure in the inner space S of the treatment liquid tank 10 is kept to be a negative pressure.

When the treatment liquid 5 is supplied as above, the valve V2 in the treatment liquid supply pipe 7 is opened, as well as the highly-pressurized air is supplied to the nozzle 11 through the highly-pressurized-air supply pipe 17 from the compressor 18, thereby to inject the treatment liquid 5 from the nozzle 11 in the same way as explained in reference to FIG. 1.

Next, when coating by a certain amount of the treatment liquid 5 is finished and thereafter, the treatment liquid tank 10 and the treatment liquid supply pipe 7 are washed, the treatment liquid 5 is discharged from the treatment liquid tank 10 and the wash liquid is supplied to the treatment liquid tank 10 from the first wash liquid tank 32*a*. The valve V1 in the treatment liquid suction pipe 33 is closed, as well as the valve V5 in the wash liquid suction pipe 35 is opened and the valve V2 in the treatment liquid supply pipe 7 of the treatment liquid tank 10 is closed.

Then, the valve V3 for the feedback line 12 is opened and a highly pressurized air is supplied to the nozzle 11 through the highly-pressurized-air supply pipe 17 from the compressor 18. Then, a negative pressure occurs in the nozzle 11 and the negative pressure becomes associated with the inner space S of the treatment liquid tank 10 through the feedback line 12 so that a negative pressure occurs caused by sucking in the air in the inner space S of the treatment liquid tank 10 due to the associated negative pressure.

Accordingly, the wash liquid is sucked from the first wash liquid tank 32*a* due to the negative pressure in the inner space S and the wash liquid is supplied to the treatment liquid tank 10 through the pipe line 14.

As described above, when the negative pressure generates by keeping on supplying the highly pressurized air to the nozzle 11 where the treatment liquid tank 10 is full of the wash liquid, the wash liquid is sucked from the nozzle 11 through the feedback line 12 and is discharged from the nozzle 11 to the outside.

Thereby the wash liquid flows into the treatment liquid tank 10, into the feed back line 12 and also into the nozzle 11 to wash them. Thereafter, the washing ends by stopping suction by the feedback line 12 due to stopping supply of the highly pressurized air to the nozzle 11.

When the nozzle 11 only is washed while the treatment liquid is present in the treatment liquid tank 10, the wash liquid is supplied from the second wash liquid tank 32*b* to the nozzle 11. Firstly the valve V6 in the wash liquid suction pipe 36 is opened and the valve V2 in the treatment liquid supply pipe 7 of the treatment liquid tank 10 is closed, as well as the valve V3 in the feedback line 12 is closed. When a highly pressurized air is supplied via the highly-pressurized-air supply pipe 17 to the nozzle 11, the negative pressure occurs in the nozzle 11 as described before, and is associated with the second wash liquid tank 32*b* via the pipe line 38. Accordingly the wash liquid is sucked from the second wash liquid tank 32*b* and supplied to the nozzle 11 via the pipe line 38 and discharged to the outside. Namely, the wash liquid flows into the nozzle 11 and can wash the nozzle 11 only and thereafter, the washing ends by stopping supply of the highly pressurized air to the nozzle 11.

In the system construction shown in FIG. 4, the nozzle 11 in which the negative pressure occurs due to supplying the highly pressurized air from the compressor 18 is used as a vacuum suction device to various pipes connected to the nozzle 11. Accordingly a system construction can be simplified since a vacuum pump is not disposed in each pipe, as well as cost reduction is possible.

Figure 5:
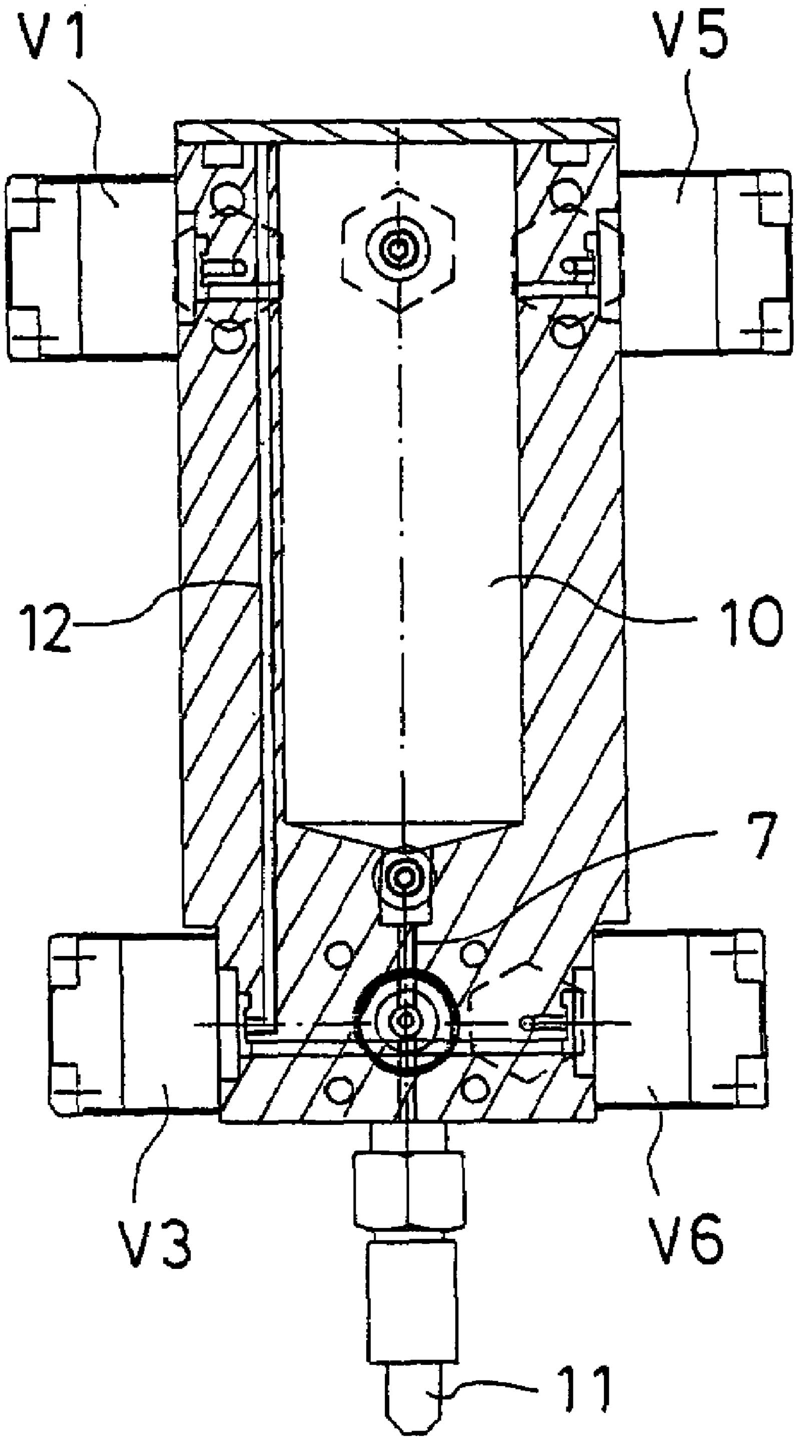
FIG. 5 is an elevation cross section view showing a detailed shape and structure of the treatment liquid tank, the nozzle and the like used in the system shown in FIG. 4
Figure 6:
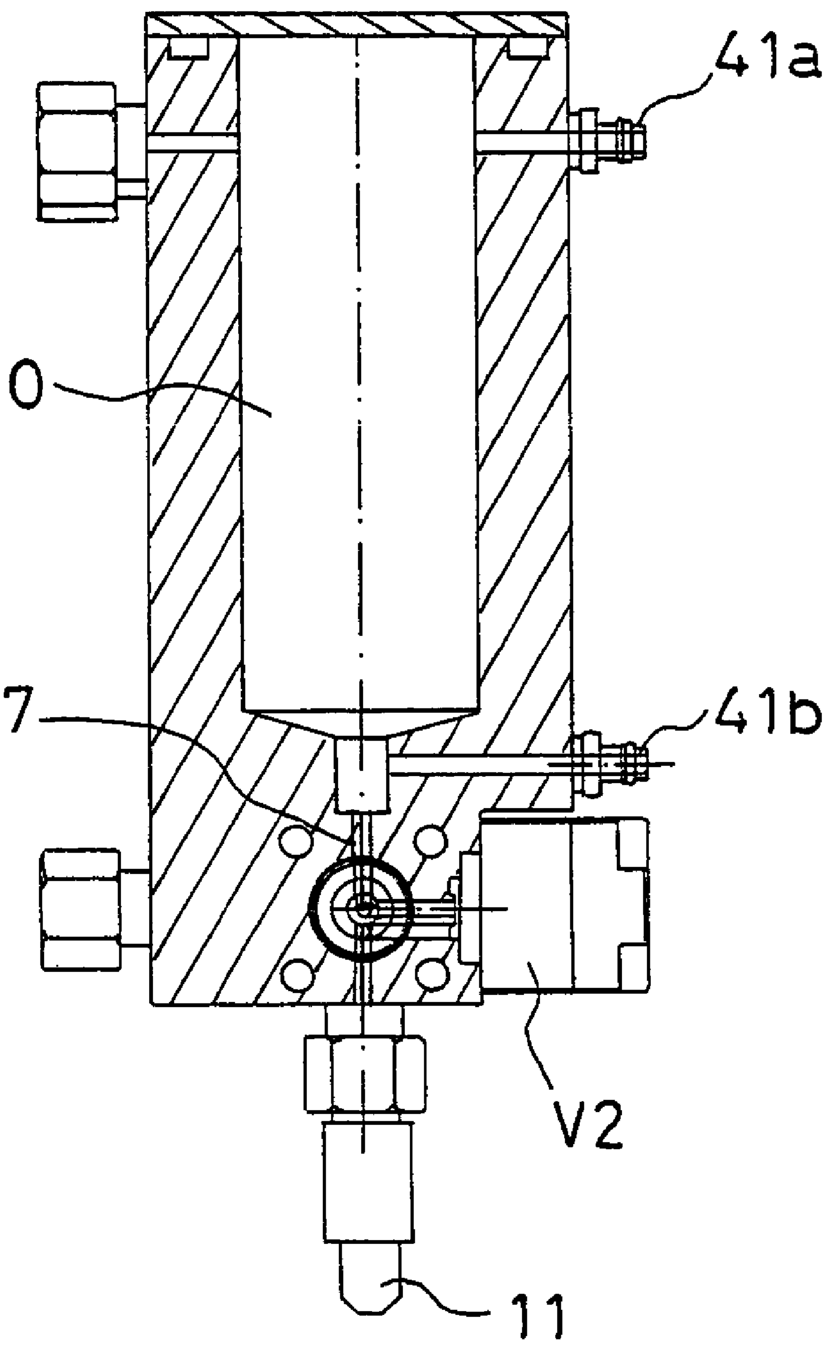
FIG. 6 is a left-side cross section view of FIG. 5.
Figure 7:
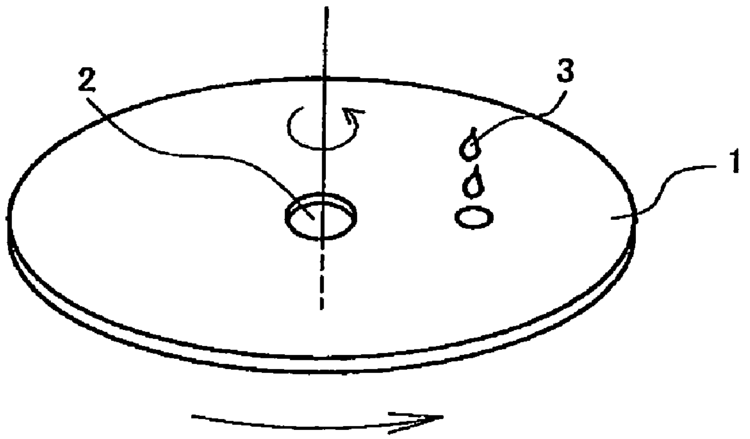
FIG. 7 PRIOR ART
FIG. 7 is an explanation view showing a state where a film is coated on a semiconductor substrate and a display substrate in an earlier apparatus.
Figure 8:
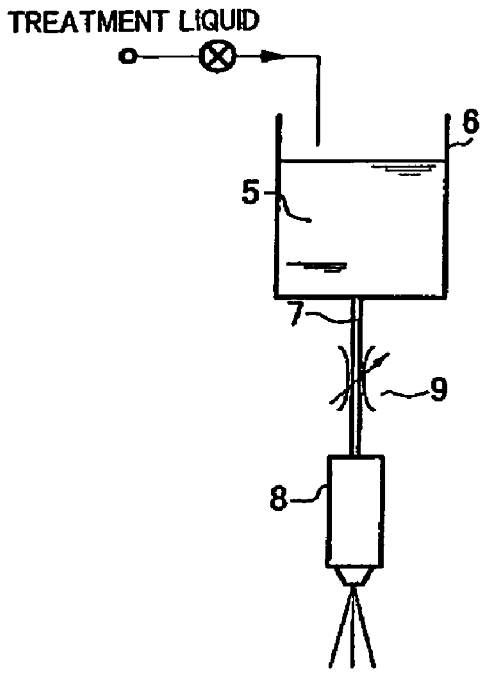
FIG. 8 PRIOR ART
FIG. 8 is a system schematic view showing a treatment liquid supply system that coats treatment liquid on an object substrate by splay coating in an earlier apparatus.

FIG. 5 and FIG. 6 are an elevation cross section and a left-side cross section showing a detailed shape and structure of the treatment liquid tank 10, the nozzle 11 and the like used in the system construction shown in FIG. 4. In the embodiment, the treatment liquid tank 10, the nozzle 11, the pipes connecting them, and the valve V1–V6 are integrally formed as a single member.

A rectangular-solid-block material made of a metal such as iron or aluminum is cut to form a bore portion as the treatment liquid tank 10, a pipe extending from the treatment liquid tank 10 to the nozzle 11 as the treatment liquid supply pipe 7, and a pipe extending from the treatment liquid tank 10 via the valve V3 to the treatment liquid supply pipe 7 as the feedback line 12 therein.

The nozzle 11 is connected through a coupling to a bottom of such cut block material to be associated with the treatment liquid supply pipe 7. The valves V1–V6 are respectively connected to the side portions of the block material to be associated with the treatment liquid supply pipe 7, the feedback line 12 and the like. In FIG. 6, a level indicator as a transparent pipe is mounted to connection ports 41*a*, 41*b* to measure an amount of the treatment liquid 5 stored in the treatment liquid tank 10.

In this construction, the treatment liquid tank 10, the nozzle 11, the pipes connecting them, and the valve V1–V6 shown in FIG. 1 or FIG. 4 are integrally formed.

Accordingly the treatment liquid tank 10, the nozzle 11 and the like can be formed in a small size, thereby enabling miniaturization of an entire system structure and a simple system structure.

What is claimed:

1. A treatment liquid supply system comprising:

a treatment liquid tank that stores treatment liquid therein and is capable of being closed in an air-tight condition;

a nozzle connected to the treatment liquid tank through a treatment liquid supply pipe, the nozzle being configured to vacuum-draw the treatment liquid from the treatment liquid tank and to jet the treatment liquid due to vacuum occurring in the nozzle caused by supplying pressurized air from outside of the nozzle thereto;

an air suction device branched in the vicinity of the nozzle from the treatment liquid supply pipe and connected to an upper side of the treatment liquid tanks, the air suction device generating vacuum in the treatment liquid tank by drawing in air within an inner space thereof;

a positive pressure supply device that supplies a positive pressure gas at a desired pressure to a vacuum space as formed in the inner space of the treatment liquid tank; and a pressure control device disposed between the positive pressure supply device and the treatment liquid tank to adjust the pressure of the positive pressure gas supplied to the treatment liquid tank by measuring a mass of the flow amount of the positive pressure gas:

wherein the treatment liquid supply system further comprises a first opening and closing valve (V2) disposed midway of the treatment liquid supply pipe to open and close a supply passage to the nozzle;

a second opening and closing valve (V3) disposed on a portion of the air suction device to open and close a fluid line communicating with the treatment liquid tank; and a third opening and closing valve (V4) disposed on a portion of the positive pressure supply device to open and close a positive pressure supply line connected to the treatment liquid tank;

wherein the first and third opening and closing valves (V2 and V4) are initially closed to provide an air-tight condition within the treatment liquid tank while opening the second opening and closing valve (V3) during supply of pressurized air to the nozzle to generate a vacuum within the nozzle, thereby permitting the vacuum to prevail in the inner space of the treatment liquid tank;

wherein the second opening and closing valve (V3) is subsequently closed while simultaneously opening the first opening and closing valve (V2) during supply of the pressurized air to the nozzle for permitting a vacuum to be generated in the nozzle which is equal to the vacuum in the inner space of the treatment liquid tank; and wherein the third opening and closing valve (V4) is thereafter opened to regulate the flow amount of the positive pressure gas supplied to the treatment liquid tank in proportion to the mass of the flow amount thereof, so that supply of the treatment liquid from the treatment liquid tank to the nozzle is adjustably minutely controlled based on a difference between the vacuum prevailing within the inner space of the treatment liquid tank and that prevailing in the nozzle.

2. A treatment liquid supply system according to claim 1, wherein the pressure control device comprises: a mass flow controller.

3. A treatment liquid supply system according to claim 1, further comprising:

a wash liquid tank for storing a wash liquid for washing the treatment liquid tank and the nozzle and capable of being closed in an air-tight condition and connected to an upper surface of the treatment liquid tank, wherein the wash liquid is drawn from the wash liquid tank due to the vacuum occurring in the inner space of the treatment liquid tank and supplied to the inside of the treatment liquid tank.

4. A treatment liquid supply system according to claim 1, further comprising:

a wash liquid tank connected to the nozzle, said wash liquid tank storing a wash liquid for washing only the nozzle and capable of being closed in an air-tight condition wherein the wash liquid is drawn from the wash liquid tank due to the vacuum occurring in the nozzle and supplied to the nozzle to wash only the nozzle.

5. A treatment liquid supply system according to claim 1, wherein the treatment liquid tank, the nozzle, the supply pipes and the opening and closing valves are integrally formed as a single member.

* * * * *